Figure 1:
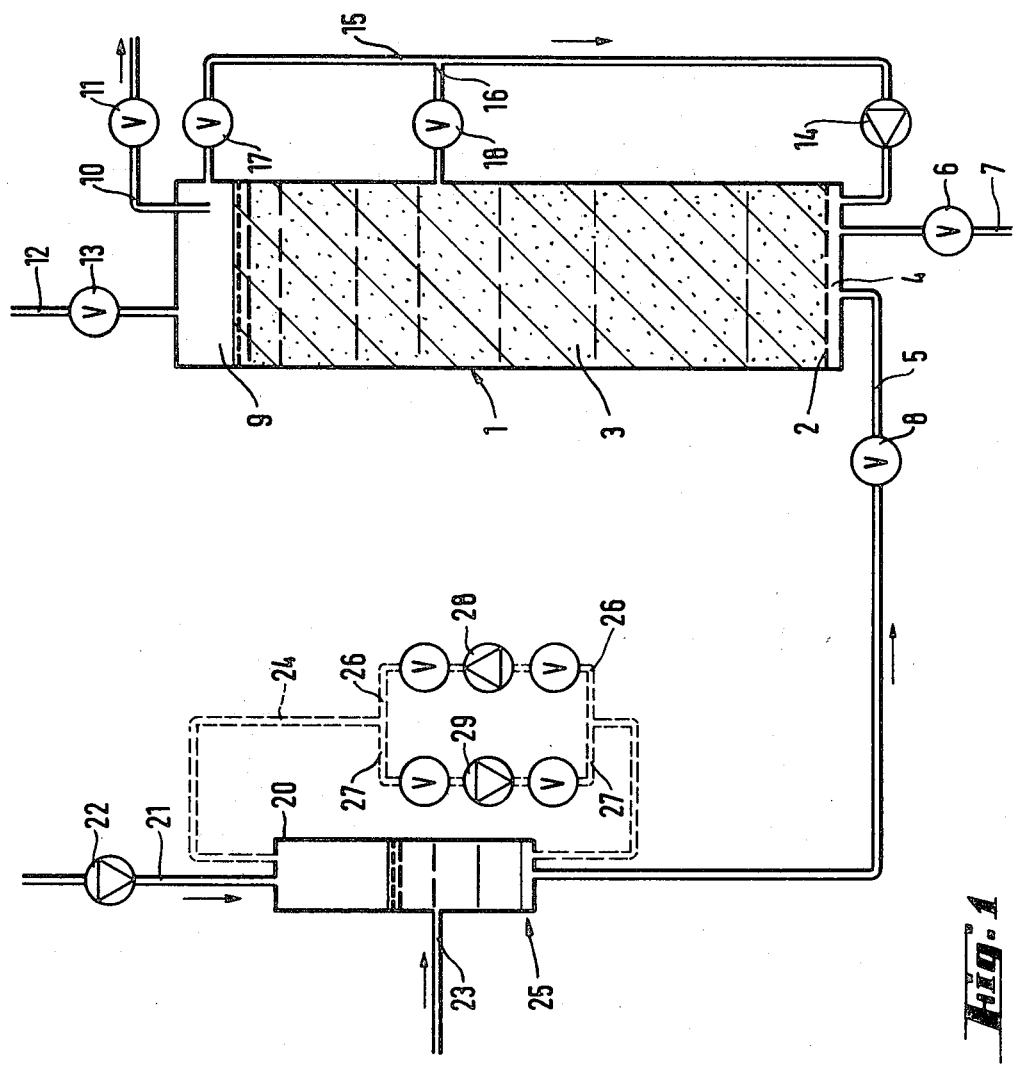

United States Patent [19]

Gros et al.

[11] Patent Number: 4,469,599
[45] Date of Patent: Sep. 4, 1984

[54] APPARATUS AND METHOD FOR DENITRIFYING WATER

[75] Inventors: Henry Gros, Winterthur; Markus Kyburz, Unterentfelden, both of Switzerland

[73] Assignee: Sulzer Brothers Limited, Winterthur, Switzerland

[21] Appl. No.: 379,135

[22] Filed: May 17, 1982

[30] Foreign Application Priority Data

May 20, 1981 [CH] Switzerland .......................... 3289/81

[51] Int. Cl.³ .............................................. C02F 3/08
[52] U.S. Cl. .................................... 210/610; 210/617; 210/150; 210/192; 210/903
[58] Field of Search ............... 210/150, 151, 188, 617, 210/618, 903, 630, 192, 220, 603, 610, 611; 204/149, 151

[56] References Cited

U.S. PATENT DOCUMENTS

| | | | |
|---|---|---|---|
| 3,829,377 | 8/1974 | Hashimoto et al. | 210/903 |
| 3,938,738 | 2/1976 | Nagel et al. | 261/DIG. 75 |
| 4,009,099 | 2/1977 | Jeris | 210/618 |
| 4,234,560 | 11/1980 | Kuerten et al. | 261/DIG. 75 |
| 4,284,508 | 8/1981 | Jewell | 210/617 |
| 4,351,729 | 9/1982 | Witt | 210/903 |

FOREIGN PATENT DOCUMENTS 54-21054 2/1979 Japan .................................. 210/903

OTHER PUBLICATIONS

Ginocchio J. C., "Biological Denitrification of Drinking Water";Sulzer Technical Review; pp. 115–117 (3/1980).

Primary Examiner—Benoît Castel
Attorney, Agent, or Firm—Kenyon & Kenyon

[57] ABSTRACT

The raw water is loaded with hydrogen in a gas loading stage and is then passed upwardly through a bed of hydrogen consuming micro-organisms in the reactor. The gas-loaded raw water is guided so that the liquid and gas phases travel through the reactor in the same direction.

The gas loading stage is substantially free from micro-organisms and nitrogen produced thereby. The contact times in the reactor are increased so that adequate quantities of hydrogen are either dissolved in the water or are available in the form of small rapidly dissolving gas bubbles.

15 Claims, 3 Drawing Figures

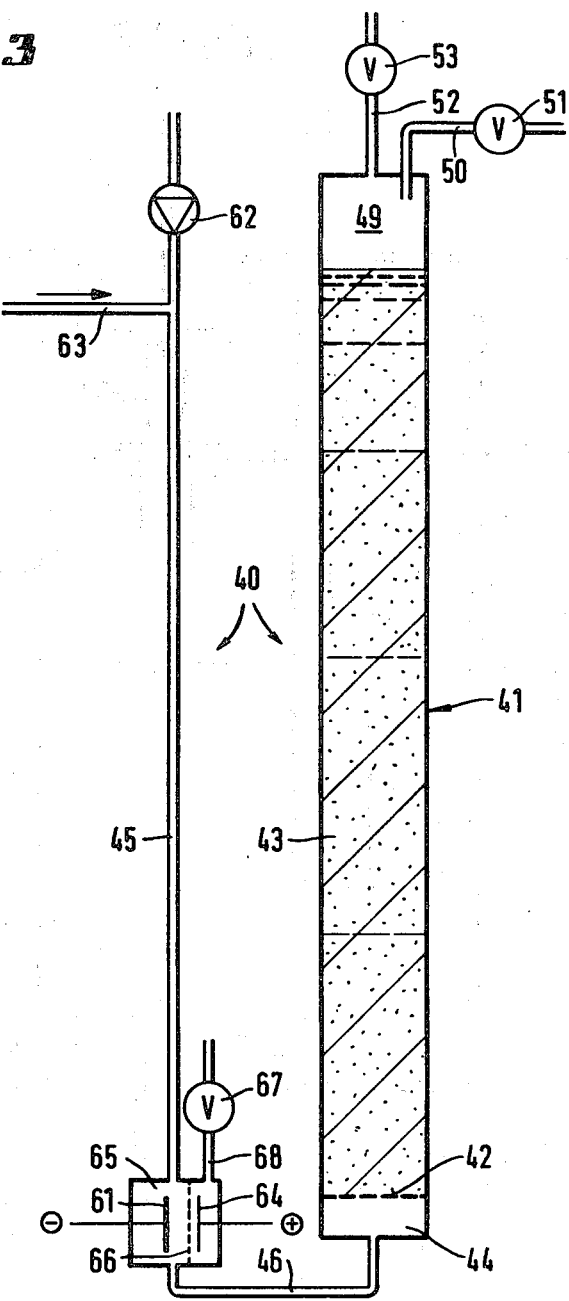

APPARATUS AND METHOD FOR DENITRIFYING WATER

This invention relates to an apparatus and method for denitrifying water and particularly drinking water.

As is known, biological denitrification of water, particularly drinking water, can be accomplished using micro-organisms which oxidize hydrogen. In such a process, nitrate ($NO_3$) or nitrite ($NO_2$) ions which are dissolved in the water are decomposed to molecular nitrogen in a number of steps (see J. C. Ginocchio, "Biologische Denitrifikation von Trinkwasser", "Sulzer Technische Rundschau" 3/80, pages 115–116).

Since the concentration of hydrogen required for the aforementioned biological decomposition is relatively high—about 9 milligrams per liter (mg/l) hydrogen ($H_2$) is required e.g. for decomposing 100 mg/l $NO_3$ ions—it is necessary to introduce considerable amounts of hydrogen into the raw water to be denitrified. It may also be necessary to add carbon-containing and phosphorus-containing nutrients and further trace elements for the organisms in the raw water.

One general problem of the aforementioned denitrification process, therefore, using the minimum amount of relatively expensive hydrogen, is to supply the micro-organisms in the water with an adequate amount of hydrogen and maintain the raw water in contact with the hydrogen in a reactor for the time required for the biological/chemical reactions. The known methods include some methods where hydrogen is directly supplied and in which raw water and gaseous hydrogen travel directly through the reactor in counter-current, the hydrogen flowing upwards through the vertical reactor. In these methods, in spite of relatively high losses of hydrogen, the amount of hydrogen introduced is insufficient due to the low solubility of hydrogen in water. The contact time is also insufficient because of the counter-current operation. In addition, gaseous nitrogen is produced in the reactor and rises therein parallel to the hydrogen. As a result, and because some of the hydrogen goes into solution, the gas phase becomes relatively depleted in hydrogen. This reduces the transfer of hydrogen from the gas phase to the liquid phase and thus reduces the amount of hydrogen going into solution.

In known systems, where hydrogen is supplied externally or indirectly, the water is conveyed in a circuit through the reactor and a gas-loading vessel. After it has circulated a number of times, adequate quantities of the difficult-to-disolve hydrogen have dissolved in the raw water and are brought into the reactor. However, since water from the reactor travels through the gas loading stage, considerable amounts of nitrogen are formed therein and dilute the hydrogen as previously described. Another disadvantage of a circulating flow is that the system requires considerable energy since the water has to be circulated e.g. about 20 times on average. In addition, the gas-loading stage is exposed to some biological growth. This reduces the hydrogen transfer in the aforementioned manner and also causes problems in the pipe and pump system.

Accordingly, it is an object of the invention to denitrify a flow of water using a minimum of energy, investment and production facilities.

It is another object of the invention to decompose relatively large amounts of nitrate or nitrite ions from water.

Briefly, the invention provides an apparatus for denitrifying water which comprises a gas loading stage for introducing hydrogen gas into a flow of raw water and a reactor which is disposed in an open circuit with the gas loading stage. The reactor is located downstream of the gas loading stage for receiving the hydrogen gas—loaded raw water flow at a lower end. The reactor also has an outlet for gas at an opposite upper end and an outlet for treated water at the upper end so that the hydrogen gas and raw water pass in concurrent relation upwardly through the reactor.

The invention also provides a method of denitrifying water in which a flow of water is loaded with at least hydrogen and thereafter the hydrogen and water are passed in concurrent relation through a hydrogen-oxidizing micro-organism containing bed. Thereby, an essential characteristic of the method is the provision that the loading of the raw water takes place in a stream flowing through, i.e. not mixed with a circulating stream from the reactor.

The method of introducing hydrogen into the flow of raw water reduces the risk that an appreciable proportion of the biological decomposition reactions will occur upstream of the reactor and thus produce the aforementioned dilution of the gas phase by the nitrogen resulting from decomposition. Since the hydrogen-loaded water and gaseous hydrogen are conveyed through the reactor in co-current, the contact times are relatively long and result in a good "yield" of hydrogen in the biological/chemical reactions. This greatly reduces the hydrogen requirement for decomposing a given amount of nitrate or nitrite.

It has been found advantageous if the hydrogen in the gas phase flows or is produced in the reactor in the form of small bubbles. This requirement is taken into account if—e.g. at least about 50% of the gas phase is in the form of bubbles having a diameter of 2–200 $\mu$m. Since small bubbles rise more slowly, the gas bubbles have a longer residence time in a reactor through which the two phases flow in co-current. The resulting increased contact times in the reactor produce a further improvement in the use made of hydrogen. Further, in the case of small gas bubbles, the ratio of the surface to the total volume of the gas phase is large. Hence, hydrogen can more easily go into solution to make up the amount used in the biological/chemical reactions.

With regard to the production of small gas bubbles, good results have been obtained by producing hydrogen by electrolytic decomposition of water, the electrodes being disposed very near the place where raw water enters the reactor. The oxygen produced at the same time can be prevented by suitable known means from flowing into the reactor. In other cases, it is advantageous to produce an excess pressure in the raw water during the gas-loading step and dissolve at least part of the introduced hydrogen; the dissolved hydrogen can subsequently be at least partially released in the form of small gas bubbles by relaxing the pressure on the hydrogen-containing raw water when or before the water reaches the reactor. The excess pressure is advantageously chosen at about 1 bar for each 10 mg/l of nitrate ions to be decomposed. This ensures that the amount of hydrogen dissolved in the raw water will be sufficient to decompose the nitrate or nitrite.

In some cases, it may be advantageous not to relax the excess pressure in the reactor completely, but to operate at an elevated pressure, thus increasing the amount of hydrogen dissolved in raw water in the total volume of water in the reactor.

If carbon-containing substances have to be added to the water in addition to hydrogen as a nutrient for the microorganisms, the raw water can be additionally treated with carbon dioxide ($CO_2$).

The gas-loading stage can advantageously be constructed to contain a pressure-increasing device for the raw water and a pressure vessel for saturating the raw water with hydrogen at excess pressures. A pressure-relaxing means can also be provided between the pressure vessel and the reactor.

If, due to the low solubility of hydrogen in water, insufficient hydrogen is introduced when the raw water travels once through the pressure vessel in the gas-loading stage, the feed can be improved by equipping the pressure vessel with a pipe for circulating the gas-loading raw water. Likewise, the reactor can be constructed as a loop reactor in order to intensify certain mixing phenomena, e.g. improved phase transitions of the substances taking part in the reactions as a result of higher flow rates without any change in total residence times in the reactor. To this end, circulation round the loop is advantageously not brought about all the way up the reactor, thus leaving a quiet region in the top part and so improving the efficient utilization of hydrogen.

A very advantageous installation, in which the pressure is automatically increased in the raw water before entering the reactor and is automatically reduced in the reactor, is obtained if the gas-loading stage and the reactor each form a vertical limb of a U-shaped system. Advantageously also, hydrogen is supplied to the gas-loading stage limb at least at approximately the same level as the place where raw water enters.

Figure 2:
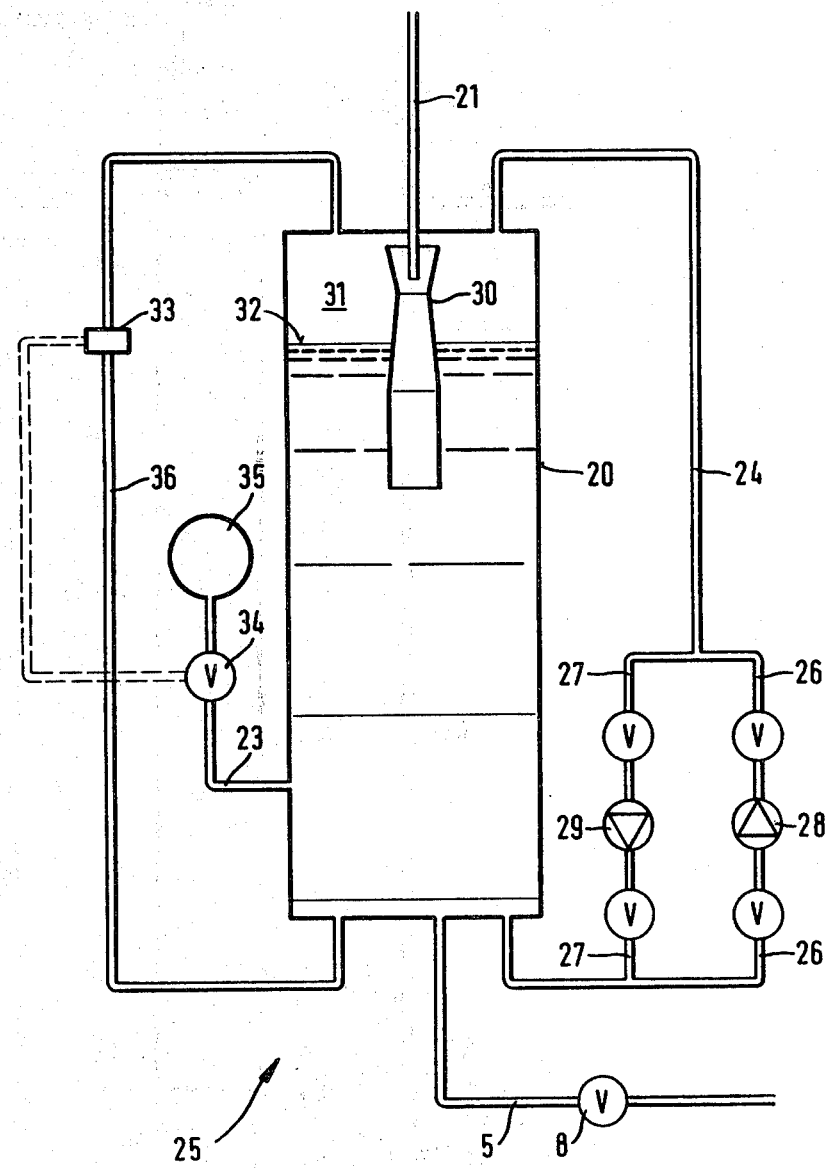

These and other objects and advantages of the invention will become more apparent from the following detailed description taken in conjunction with the accompanying drawings in which:

FIG. 1 diagrammatically illustrates an apparatus according to the invention in which hydrogen is supplied at elevated pressure;

FIG. 2 illustrates an embodiment of the part of the apparatus of FIG. 1 in which hydrogen is introduced, and FIG. 3 illustrates a second embodiment of an apparatus in accordance with the invention in the form of a U-tube.

Referring to FIG. 1, in order to denitrify water using micro-organisms, the apparatus comprises a reactor 1 containing a solid or fluidized bed 3 mounted on an intermediate tray 2 which is permeable to gas and water. The bed 3 can be a granulated material known in filter technology, e.g. sand, active carbon, calcium carbonate or plastics packing material. Alternatively, the solid bed 3 can comprise "static" mixing components. The packing or structures in the reactor 1 serve as carrier materials for colonies of micro-organisms which decompose nitrate or nitrite ions.

A distribution and mixing chamber 4 is disposed in the reactor 1 below the tray 2 and receives a raw-water supply pipe 5 and a nutrient supply pipe 7 equipped with a shut-off means 6. Additional carbonaceous and/or phosphorous-containing nutrients are supplied to the reactor 1, if required for maintaining the active life of the micro-organisms, through the feed pipe 7. The pipe 7 can also serve as a discharge pipe for backwash liquid, if the reactor 1 has to be periodically cleaned by flushing the solid bed 3.

Above the bed 3, the reactor 1 comprises a chamber 9 for collecting treated water, the water being discharged from the reactor 1 through a pure-water outlet in the form of a pipe 10 containing an adjustable throttle and shut-off means 11. The gas phase travelling through the reactor 1 is also separated from the pure water in the chamber 9. The gases are then removed through a gas outlet in the form of a pipe 12 which is closable by an adjustable throttle and shut-off means 13. The means 11 and 13 are usually pressure-reducing valves, and if required, can maintain a certain excess pressure in the reactor 1, thus increasing the amount of hydrogen dissolved in the water, as previously mentioned.

The reactor 1 is constructed as a loop reactor, i.e. in order to increase the flow speed at a given residence time, some of the gas-water mixture in the reactor can be circulated in at least a part of the reactor volume. The circulation is produced by a circulating pump 14, which conveys the circulating material back to the distribution chamber 4 via pipes 15 and 16, which branch from the chamber 9 or bed 3 and are equipped with adjustable, shut-off throttle valves 17, 18 for adjusting the amount in circulation.

The raw-water supply pipe 5, in which a pressure relief or relaxing device 8 is incorporated, connects the reactor 1 to a gas-loading stage or means 25, which substantially comprises a pressure vessel 20 which will be described in detail in conjunction with FIG. 2. The vessel 20 receives a raw-water feed pipe 21 containing a pressure-increasing pump 22 which increases the pressure of the raw water before the water enters the vessel 20. The vessel 20 also receives a hydrogen feed pipe 23 which connects the vessel 20 to a source of compressed hydrogen gas (not shown).

The vessel 20, which is filled to a certain level with water, is also equipped with a system for circulating the water therein and/or the hydrogen stored in its gas space. The circulating system, as before, comprises a pipe 24 comprising two parallel portions 26, 27 which may be shut off, a circulating pump 28 for water and a circulating bellows 29 for hydrogen.

Referring to FIG. 2, the raw-water line 21 in the vessel 20 opens into an ejector 30 through which hydrogen is sucked from the gas compartment 31 of the vessel 20, which is filled with hydrogen, and is introduced into the stream of raw water. After a certain residence time, the gas-loaded water, in which some hydrogen has dissolved, flows through the supply pipe to the reactor 1 (FIG. 1) after the pressure has been relaxed if necessary to the valve 8.

If a single transit of raw water through the vessel 20 is insufficient to dissolve sufficient hydrogen in the water or saturate the water with hydrogen, if necessary, the mass transfer in the vessel 20 can be increased by circulation through the line 24, using the pump 28. Alternatively, hydrogen can be circulated through the pipe 24 in the opposite direction by the bellows 29, so that the hydrogen repeatedly travels through the water in the vessel 20.

The level 32 of water in the vessel 20 is adjusted by a measuring probe 33 which is disposed in a level-measuring pipe 36 and acts on a shut-off valve 34 in the pipe 23. The pipe 23, in turn, connects the vessel 20 to a pressure source (e.g. a cylinder) 35 for hydrogen. If level 32 rises above the height of the probe 33, the valve 34 is opened. The additional inflow of hydrogen presses the water level 32 downwards until the level falls below the level of the probe 33 and the valve 34 is closed.

The installation described with reference to FIGS. 1 and 2 operates as follows:

The raw water can contain nitrate in concentrations of from 30 to over 200 mg/l. In the present example, the nitrate concentration is about 100–110 mg $NO_3$ ions per liter. The water is brought to a pressure of e.g. 7 bars by the pump 22, at which pressure the water flows through the ejector 30 into the vessel 20, in which the pressure is about 6 bars. As a result of this slight decrease in pressure, the water entrains hydrogen from the pressure-chamber gas compartment 31, which is filled with hydrogen. As described, the volume of the chamber 31 is maintained by the level regulator 33, which actuates the on/off shut-off valve 34. A pressure-reducing valve (not shown) is disposed upstream of the valve 34 and reduces the very high gas pressure in the cylinder 35, likewise to 7 bars.

Water remains in the gas-loading stage 25 for a number of minutes (e.g. 4 or 5). If the water is flowing through directly and these times cannot be maintained, some of the water is circulated through the pipe 24 by the pump 28. The absorption of hydrogen can also be increased by circulating hydrogen through the line 24, using bellows 29.

The water gas-loaded at excess pressure absorbs up to 2 mg/l $H_2$ per bar of pressure. As already mentioned, about 9 mg/l $H_2$ is necessary for decomposing 100 mg/l $NO_2$. The pressure in the vessel 20 must be chosen accordingly.

The water, which is saturated or at least nearly saturated with $H_2$, flows through the valve 8, in which the pressure is reduced to about 4 bars, equal to the pressure at the bottom of reactor 1, and then flows into the chamber 4, for distribution over the entire surface of the reactor 1 and flows upwards through the apertures in the tray 2 into the bed 3, which serves as a carrier material for the micro-organisms.

The pressure in the chamber 4, which is produced by the valve 8, corresponds to the sum of the pressure of the water column in the reactor 1, the pressure drop at the bed 3 and any excess pressure maintained at the end of the reactor 1, as maintained and adjusted by the valves 11 and 13. The residence times in the reactor 1 are between 0.5 and a few hours if the carrier material for the micro-organisms comprises static mixing components having an internal area between 100 and 500 $m^2/m^3$. In the present case, the internal area of the mixing components is about 300 $m^2/m^3$. The pressure maintained at the end of the reactor is 2 bars. As a result of the pressure relaxation in the valve 8, some of the $H_2$ previously dissolved in the water is expelled in the form of small gas bubbles between e.g. 10 and 400 μm in size. These bubbles, on account of their relatively low buoyancy, rise relatively slowly in the bed 3, thus improving the efficient utilization of $H_2$ for the biological/chemical reaction.

Since the water for treatment contains large quantities of $NO_3$ ions, the biological decomposition reactions may sometimes produce a deficiency of carbonaceous and/or phosphorous-containing nutrients for the micro-organisms, or the pH may become excessive. These shortcomings are obviated by adding measured amounts of carbon and/or phosphorous, e.g. by adding yeast extract in traces, e.g. in amounts of a few mg/l, or by adding carbon dioxide in an amount sufficient to maintain the pH at approx. 7, through the pipe 7 after opening the valve 6.

After the valves 17 or 18 have been opened, the water is circulated through the pipes 15, 16 by the pump 14. During the circulation, in which the individual water particles travel round from 3 to 10 times on average before leaving the reactor 1 through the pipe 10, the flow speed in the reactor 1 is considerably increased without altering the average residence time, thus improving the mixing intensity and the phase transitions between the individual substances participating in the reactions. If circulation through the line 16 is brought about up to about ⅔ of the total height of the reactor, a quiet region in the reaction mixture is left above. Thus, the $H_2$ in the water is used more efficiently than if circulated all the way up the reactor. After a residence time of about 2 hours, the denitrified water leaves the reactor 1 through the pipe 10 with the nitrate content reduced about 5–10 mg $NO_3/l$.

Referring to FIG. 3, the installation comprises a U-shaped system 40 in which the right limb 41 forms the reactor, which contains a solid bed 43 carrying the micro-organisms, disposed as before on an intermediate tray 42. A pipe 50 provides an outlet for discharging the denitrified water and is equipped with a shut-off valve 51, whereas the gas phase, after being separated from water in a collecting chamber 49, is discharged through a pipe 52 equipped with a valve 53. The reactor 41, like the first embodiment of the reactor, can be equipped with a circulating system and with pipes for supplying measured amounts of nutrients and/or acid.

The left limb 45 of the U-shaped system 40, which can be e.g. between 20 and 80 meters high, is used for producing an excess pressure in the raw water before the water enters the reactor 41. The raw water is conveyed downwards by a pump 62, reaching flow speeds of e.g. 0.3 to 2 meters per second. If the pump 62 is an excess-pressure pump, an excess pressure of e.g. 2–4 bars can also be maintained at the end of the reactor 41, and can be adjusted and reduced by the valves 51 and 53.

An $H_2$ feed pipe 63 supplied from a suitable hydrogen source (not shown) opens into the limb 45 at about the same height as the raw water enters and about the height of the water in the reactor 41. The pipe 63 supplies hydrogen at an appropriate pressure to the raw water. The two media flow together downwards, the pressure being continuously increased and $H_2$ being progressively and increasingly dissolved in the water in accordance with the increased pressure.

Alternatively, the supply of gaseous $H_2$ can be replaced or supplemented by a device 65 in which water is electrolytically decomposed. The device 65 can be disposed anywhere up the limb 45, but in the illustrated system is disposed near the horizontal limb 46 of the U-shaped tube 40, in order, if possible, to prevent the small gas bubbles produced by electrolysis from combining to form large bubbles before the gas-loaded water enters the distribution chamber 44 of the reactor 41.

The device 65, which is known, comprises a cathode 61 at which hydrogen is generated and an anode 64 producing oxygen. Oxygen is prevented from entering the stream of raw water by an oxygen trap, diagrammatically indicated by a shutter 66, which transmits hydrogen but retains oxygen. Oxygen can escape from the trap through a discharge pipe 68 equipped with a valve 67. Electrodes 61 and 64 are both made e.g. of platinum-plated titanium and are connected to a d.c.

source (not shown). The power consumed by the device 65 in generating 1 g H₂ is e.g. between 0.2 and 0.6 kWh.

As mentioned, the electrolysis produces H₂ preferably in the desired form of small gas bubbles, which partly dissolve in the raw water and are partly entrained thereby and travel to the chamber 44 and thence to the reactor 41. The operation is similar to that of reactor 1 in the first embodiment.

The installation in FIG. 3, operating on raw water containing the same concentration as in Example 1, also reduces the content of NO₃ ions in the treated water leaving reactor 41 to about 5–10 mg/l.

What is claimed is:

1. An apparatus for denitrifying water comprising
   a gas loading stage operatively connected to a source of hydrogen for dissolving hydrogen gas into a flow of raw water, said gas loading stage including a pressure vessel for receiving raw water and hydrogen gas and means connected to said pressure vessel for increasing the pressure of the raw water whereby the raw water can be saturated with hydrogen at an excess pressure;
   a pipe extending from said pressure vessel to convey hydrogen-loaded raw water therefrom;
   a reactor disposed in an open circuit with said gas loading stage, said reactor being disposed downstream of said gas loading stage and connected to said pipe for receiving the hydrogen gas-loaded raw water flow at a lower end, said reactor having a bed of micro-organisms for decomposing nitrate and nitrite ions, an outlet for gas at an opposite upper end and an outlet for treated water at said opposite upper end whereby the hydrogen gas and raw water pass in concurrent relation upwardly through said reactor.

2. An apparatus as set forth in claim 1 which further comprises a pressure relief means between said pressure vessel and said reactor for relieving the pressure in the flow of raw water.

3. An apparatus as set forth in claim 1 wherein said gas-loading stage further includes a circulating system connected to said pressure vessel for circulating the gas loaded raw water through said pressure vessel.

4. An apparatus as set forth in claim 1 wherein said reactor is a loop reactor.

5. An apparatus as set forth in claim 1 wherein said bed is a granular bed carrying micro-organisms for decomposing nitrate and nitrite ions.

6. An apparatus as set forth in claim 5 wherein said reactor further includes a distribution and mixing chamber below said bed and a separating chamber above said bed for separating treated water from gas and being in communication with each said outlet.

7. An apparatus as set forth in claim 6 which further comprises a nutrient supply pipe connected to said distribution and mixing chamber for delivering carbonaceous and/or phosphorus-containing nutrients thereto.

8. An apparatus for denitrifying water comprising
   a gas loading means for dissolving hydrogen gas in a flow of raw water to saturate the water with hydrogen, said gas loading means including a pressure vessel for receiving raw water and hydrogen gas and means connected to said pressure vessel for increasing the pressure of the raw water whereby the raw water can be saturated with hydrogen at an excess pressure; and
   a reactor disposed in an open circuit with said gas loading means downstream of said gas loading means for receiving the hydrogen gas-saturated raw water flow at a lower end, said reactor having a bed carrying micro-organisms for denitrifying the water, an outlet for gas at an opposite upper end and an outlet for treated water at said opposite upper end whereby the hydrogen gas and raw water pass in concurrent relation upwardly through said bed.

9. An apparatus for denitrifying water comprising
   a first vertical limb having a raw water inlet and a hydrogen gas inlet at approximately the same elevated height to convey raw water and hydrogen gas in a downward flow in said limb to progressively and increasingly dissolve the hydrogen gas in the raw water under increasing pressure;
   a reactor defining a second vertical limb, said reactor having a chamber for receiving a hydrogen gas-saturated raw water flow at a lower end, a bed carrying micro-organisms above said chamber for denitrifying the water, an outlet for gas at an upper end and an outlet for treated water at said upper end whereby the hydrogen gas and raw water pass in concurrent relation upwardly through said bed; and
   a horizontal tube connecting said vertical limbs to conduct a flow of hydrogen gas-saturated raw water from said first limb into said chamber of said second limb.

10. An apparatus as set forth in claim 9 which further comprises a device in said first limb for electrolyticall decomposing water to produce small hydrogen gas bubbles in the raw water in said second limb.

11. A method for denitrifying water comprising the steps of
    loading a pressurized flow of water with at least hydrogen gas from a source of hydrogen in a gas-loading stage with the flow of water pressurized at about 0.5 to 1.0 bar for each 10 milligrams/liter of nitrate ions to be decomposed to dissolve at least a part of the hydrogen gas;
    thereafter passing the hydrogen gas loaded water upwardly through a hydrogenoxidizing micro-organism containing bed in a reactor disposed in an open circuit with the gas-loading stage to release the hydrogen gas for concurrent flow with the water to decompose nitrate and nitrite ions in the water for denitrification of the water; and removing denitrified water from above the bed.

12. A method as set forth in claim 11 which further comprises the steps of electrolytically decomposing water to obtain hydrogen and passing the obtained hydrogen into the flow of water in the gas loading stage.

13. A method as set forth in claim 11 which further comprises the step of operating the reactor at elevated pressure.

14. A method for denitrifying water comprising the steps of
    loading a pressurized flow of water with at least hydrogen in at least a partially dissolved state in a gas-loading stage with the flow of water pressurized at about 0.5 to 1.0 bar for each 10 milligrams/liter of nitrate to be decomposed;
    relieving the pressure of the flow of water downstream of the gas-loading stage to at least partly re-expel hydrogen in the form of small gas bubbles; and thereafter passing the hydrogen and water in concurrent relation through a hydrogen-oxidizing microorganism containing bed in a reactor to decompose nitrate and nitrite ions in the water for denitrification of the water; and removing denitrified water from above the bed.

15. A method for denitrifying water comprising the steps of introducing a flow of raw water and a flow of hydrogen gas at an elevated height into a vertical limb of a U-shaped system to progressively and increasingly dissolve the hydrogen gas in the raw water under increasing pressure during downward flow in the limb;

thereafter passing the hydrogen gas saturated wate from the one limb upwardly into a second limb of the system and through a bed containing microorganisms for decomposing nitrate and nitrite ions;

removing denitrified water from above the bed at an upper end of the second limb; and venting gas from the upper end of the second limb.

* * * * *

UNITED STATES PATENT AND TRADEMARK OFFICE
CERTIFICATE OF CORRECTION

PATENT NO. : 4,469,599
DATED : September 4, 1984
INVENTOR(S) : Henry Gros

It is certified that error appears in the above-identified patent and that said Letters Patent is hereby corrected as shown below:

| Column | Line | Change From | To |
|--------|------|-------------|-----|
| 4 | 50 | to | -in- |
| 8 | 30 | electrolyticall | -electrolytically- |
| 10 | 4 | wate | -water- |

Signed and Sealed this

Twenty-sixth Day of February 1985

[SEAL]

Attest:

DONALD J. QUIGG

Attesting Officer

Acting Commissioner of Patents and Trademarks